Patented Nov. 7, 1950

2,529,211

UNITED STATES PATENT OFFICE 2,529,211

FIRE EXTINGUISHING COMPOSITION AND METHOD

Warren F. Busse, Joseph M. Lambert, and Peter P. Debye, Easton, Pa., assignors to General Aniline & Film Corporation, New York, N. Y., a corporation of Delaware No Drawing. Application January 12, 1946, Serial No. 641,014

9 Claims. (Cl. 252—3)

The present invention relates to fire extinguishing and new compositions for extinguishing fires and more particularly to such compositions which when combined with water and a gas, such as air, will produce fire extinguishing foams highly effective for extinguishing fires of flammable liquids.

It has already been proposed to prepare foam forming solutions which contain certain wetting agents and foam stabilizers. Preparations heretofore proposed are made up from various proteins, such as soy bean proteins, proteins from hoofs, albumen, and blood. However, the foams produced from such compositions, while more or less effective in extinguishing certain types of fires, do not produce a foam which is satisfactorily stable toward heat. As a result, large quantities of foam applied continuously and in great mass, and the building up of thick foam blankets are required for extinguishing the fires. Such solutions accordingly have been unsatisfactory in the extinguishment of spill and crash fires, such as airplane crash fires, since in the case of the fires, there are no protecting walls to retain thick layers of foam.

It is, accordingly, an object of our invention to produce solutions which readily form foam and which produce foams that have high heat stability.

It is a further object of our invention to produce foams which will extinguish fires with a thinner foam blanket.

Other objects of our invention are to provide foams which quickly spread and flow readily over the flammable liquid and possess self-sealing qualities, so that if for any reason the blanket of foam is broken, the break quickly seals itself and the fire is rapidly extinguished.

Another object of our invention is to provide solutions which generate foams that are highly impermeable to gases, thereby preventing evaporation of the flammable liquid and quickly extinguishing the fire.

A still further object of our invention is to provide a simple method for extinguishing flammable liquid fires which extinguishes fires with minimum amounts of foam.

According to our invention we provide compositions which are particularly useful for producing mechanical foams or so-called air foams for fire extinguishing purposes. For producing such foams, any standard mechanical foam forming equipment may be used. The composition in concentrated form is introduced into a stream of water in any proportion suitable for forming foam. Air is entrained in the stream to convert the solution into a foam which is directed against the fire.

In general, our invention comprises aqueous solutions containing a surface tension reducing agent in combination with Karaya gum as a foam stabilizer. As specific examples of the surface tension reducing agents, which are particularly effective in the composition, there are mentioned N-caprylyl, N-octyl taurine sodium salt, lauryl sodium sulfate, and the ammonium salt of triisobutyl sulfotricarballylate. In general, the surface tension reducing agents are used in amounts ranging from .25% to about 5% and the Karaya gum is used in the amounts of 0.1 to about 2% in the final foam forming solution.

In the concentrated form of the solutions, the ingredients may be present therein up to the limit of their solubility in water. Depending on the concentration of the starting solution the rate of dilution may be from 7 to 20 parts of water to 1 part of the concentrated solution. The ratios are expressed in terms of gallons of water to gallons of concentrated solution.

Illustrative of our invention are the following examples:

Example 1

An aqueous composition containing 1% of lauryl sodium sulfate and 0.2% of Karaya gum was prepared by dissolving and mixing the ingredients in water. When passed through a foam forming nozzle, this solution was readily converted into a foam which when projected on a gasoline fire extinguished the fire in from 2 to 4 seconds.

Example 2

An aqueous solution containing 1% of lauryl sodium sulfate and 0.1% of Karaya gum was converted into a foam by a foam forming nozzle and projected upon a gasoline fire. The solution extinguished the fire in approximately 4 seconds.

Example 3

An aqueous solution containing 0.5% of N-caprylyl, N-octyl taurine sodium salt and 0.2% of Karaya gum was converted into a foam and projected upon a gasoline fire. The fire was extinguished in about 7 seconds.

Example 4

A solution as in Example 3 was converted into a foam and the foam projected upon a benzene fire. The fire was extinguished in about 6 seconds.

Example 5

An aqueous solution containing 1% of lauryl sodium sulfate and 0.25% of Karaya gum was projected upon a benzene fire as a foam by a foam forming nozzle. The solution extinguished the fire in 2 seconds.

Example 6

A solution containing 1% of the ammonium salt of tri-isobutyl sulfotricarballylate and 1% of Karaya gum was prepared by dissolving and mixing the ingredients in water. The solution was readily converted into a foam using a standard type of foam forming nozzle. When the foam was applied to a gasoline fire, it readily extinguished the same in about 3 seconds.

In addition to lauryl sodium sulfate there may be used in general other salts of other sulfuric esters of high aliphatic alcohols containing more than 8 carbon atoms as, for instance, nonyl, decyl, undecyl, hexadecyl, and octadecyl sulfates or mixtures thereof. In addition to the N-caprylyl, N-octyl taurine there may be used N-acyl, N-alkyl taurines in which the acyl and alkyl radicals each contain at least 7 carbon atoms, for example, N-heptoyl, N-heptyl taurine; N-heptoyl, N - octyl taurine; N - 2 - ethyl - hexyl, N - octyl taurine; N-lauroyl, N-lauryl taurine, and N-dodecyl, N-amyl taurine. Instead of the ammonium salt of tri-isobutyl sodium sulfotricarballylate, there may be used other polyalkyl esters of sulfotricarballylic acids, such as the sodium salt of tributyl, triamyl, and trihexyl sulfotricarballylates. In general, the alkali metal salts, for example, sodium, potassium, and ammonium salts of the abovementioned surface tension reducing agents may be used.

Examples of other surface tension reducing agents which may be used include the alkali metal salts of the dialkyl esters of sulfosuccinic acid, e. g., dihexyl sodium sulfosuccinate, diamyl sodium sulfosuccinate, dioctyl sodium sulfosuccinate and diisobutyl sodium sulfosuccinate; alkali metal salts of alkyl-naphthalene sulfonic acid, e. g., sodium diisopropylnaphthalene sulfonate; pentadecanone sodium sulfonate and alkylphenol-ethylene oxide condensation products, e. g., the diisobutylphenol-ethylene oxide condensation product.

The advantages of our novel compositions are that they readily form abundant foam and that the foam produced is highly stable to heat, requiring no metal salts as heretofore required with protein foams to stabilize them against heat. In addition, the foam is highly stable toward the flammable liquid to which it is applied. It floats on the liquid for very long periods of time and is not broken down by the liquid. Owing to its high stability, reignition or "flashbacks" of the flammable liquid, when it comes in contact with hot metal, is prevented by the heat-resistant fire-smothering blanket produced by the foam.

In addition, our foam is highly impermeable to the vapors of the burning liquid, contains a considerable amount of water which aids in the extinguishment of the fire, and entrains the water in the foam bubbles so that the foam drains very slightly. Another feature of our foam producing compositions is that they form small size bubbles and that the foam can be formed from relatively concentrated solutions of the ingredients, thereby making it unnecessary to store and to transport large quantities of liquid.

Still another advantage of our compositions is that some of the surface tension reducing agents used form solutions which have a positive spreading coefficient when applied to water-immiscible flammable liquids, such as benzene, toluene, xylene, kerosene, fuel oils and turpentine. By this, we mean that the surface tension of the solution plus the interfacial tension is less than the surface tension of the flammable liquid. As a result of such positive spreading coefficient, the solutions have a tendency spontaneously to cover the flammable liquid with an aqueous film, thus reducing the rate of evaporation and aiding in the extinguishment of the fire. Thus, our solutions exert a double fire extinguishing action; namely, that of the aqueous film which tends to reduce evaporation and that of the foam which reenforces the film and smothers the fire. As a result of the action of the aqueous film on the surface of the fire, a thinner foam blanket will smother the fire. This means a considerable economy in the amount of foam solution required to extinguish a fire.

Because of the positive spreading coefficient, the foam tends to be self-sealing so that if the foam blanket is ruptured, it readily tends to seal itself and extinguish any flames in the area which has been uncovered. Since only a thin foam blanket is necessary to extinguish the fire, our foam solutions are highly effective for extinguishing crash and spill fires where there are no retaining walls to permit building up of heavy or thick foam blankets.

We claim:

1. A fire extinguishing foam forming composition capable of producing large quantities of stable air foam with water which essentially consists of an aqueous solution containing from about 0.25 to about 5% of a member of the group consisting of anionic and non-ionic, non-saponaceous surface tension reducing agents and 0.1 to about 2% of Karaya gum.

2. A fire extinguishing foam forming composition capable of producing large amounts of stable air foam with water which essentially consists of a solution of approximately 1% of N-caprylyl, N-octyl taurine sodium salt and about 0.2 to 2% of Karaya gum.

3. A fire extinguishing foam forming composition capable of producing large amounts of stable air foam with water which essentially consists of a solution of approximately 1% of lauryl sodium sulfate and about 0.2–2% of Karaya gum.

4. A fire extinguishing foam forming composition capable of producing large amounts of stable air foam with water which essentially consists of a solution of approximately 1% of dioctyl sodium sulfosuccinate and about 0.2–2% of Karaya gum.

5. A method of extinguishing fires which comprises applying thereto a foam produced from a composition consisting essentially of an aqueous solution of about 1% of N-caprylyl, N-octyl taurine sodium salt and about 0.2 to 2% of Karaya gum.

6. A method of extinguishing fires which comprises applying thereto a foam produced from a composition consisting essentially of an aqueous solution of about 1% of lauryl sodium sulfate and about 0.2–2% of Karaya gum.

7. A method of extinguishing fires which comprises applying thereto a foam produced from a composition consisting essentially of an aqueous solution of about 1% of dioctyl sodium sulfosuccinate and about 0.2–2% of Karaya gum.

8. A method of extinguishing fires which comprises applying thereto a foam produced from a composition consisting essentially of an aqueous solution of a member of the group consisting of anionic and non-ionic, non-saponaceous surface-tension reducing agents in a concentration from about 0.25 to about 5% and Karaya gum in a concentration from about 0.1 to 2%.

9. A composition of matter in concentrated form, yielding solutions capable of producing large quantities of stable, fire extinguishing air-foam when diluted with 7–20 parts of water per part of said composition, said composition consisting essentially of an aqueous solution of a member of the group consisting of anionic and non-ionic, non-saponaceous surface-tension reducing agents in a concentration of at least 1.75% and Karaya gum in a concentration of at least 0.7% but not more than 40%.

WARREN F. BUSSE.
JOSEPH M. LAMBERT.
PETER P. DEBYE.

REFERENCES CITED

The following references are of record in the file of this patent:

UNITED STATES PATENTS

| Number | Name | Date |
|---|---|---|
| 2,028,091 | Jaeger | Jan. 14, 1936 |
| 2,130,362 | Muncie | Sept. 20, 1938 |
| 2,166,008 | Holter | July 11, 1939 |
| 2,247,741 | Beller | July 1, 1941 |
| 2,258,587 | Goodner | Oct. 14, 1941 |
| 2,303,366 | Katzman | Dec. 1, 1942 |

FOREIGN PATENTS

| Number | Country | Date |
|---|---|---|
| 209,469 | Switzerland | July 16, 1940 |

OTHER REFERENCES

Hackh's Chemical Dictionary, third edition, The Blackiston Co., Phila. Penna., p. 465.

Goldsmith: Non-ionic Surface Active Agents, Chemical Industries, March 1943, pp. 326–328.